United States Patent
Chirakansakcharoen et al.

(10) Patent No.: US 7,444,629 B2
(45) Date of Patent: Oct. 28, 2008

(54) AUTONOMIC SELF-HEALING OF JAVA RESOURCES

(75) Inventors: Monsak Chirakansakcharoen, Raleigh, NC (US); Thomas Joseph Prorock, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 10/987,837

(22) Filed: Nov. 12, 2004

(65) Prior Publication Data

US 2006/0112379 A1    May 25, 2006

(51) Int. Cl.
*G06F 9/44* (2006.01)
(52) U.S. Cl. .................. 717/166; 717/171; 717/177
(58) Field of Classification Search ............. 717/166, 717/168–178
See application file for complete search history.

(56) References Cited

U.S. PATENT DOCUMENTS

| | | | |
|---|---|---|---|
| 5,500,890 A | 3/1996 | Rogge et al. | |
| 5,535,407 A | 7/1996 | Yanagawa et al. | |
| 5,577,266 A | 11/1996 | Takahisa et al. | |
| 5,815,718 A * | 9/1998 | Tock ........................... | 717/166 |
| 5,920,725 A * | 7/1999 | Ma et al. ..................... | 717/171 |
| 5,966,542 A * | 10/1999 | Tock ........................... | 717/166 |
| 6,339,841 B1 * | 1/2002 | Merrick et al. .............. | 717/166 |
| 6,363,436 B1 * | 3/2002 | Hagy et al. .................. | 719/331 |
| 6,530,080 B2 * | 3/2003 | Fresko et al. ................ | 717/166 |
| 6,606,744 B1 | 8/2003 | Mikurak | |
| 6,658,658 B1 * | 12/2003 | Jones et al. .................. | 717/162 |
| 6,708,276 B1 * | 3/2004 | Yarsa et al. .................. | 726/6 |
| 6,754,704 B1 * | 6/2004 | Prorock ....................... | 709/224 |
| 6,754,889 B1 * | 6/2004 | Leverenz ..................... | 717/127 |
| 6,760,748 B1 * | 7/2004 | Hakim ......................... | 709/204 |
| 6,823,509 B2 * | 11/2004 | Webb ........................... | 718/1 |
| 6,829,761 B1 * | 12/2004 | Sexton et al. ................ | 717/165 |
| 6,944,662 B2 * | 9/2005 | Devine et al. ............... | 709/225 |
| 6,968,549 B1 * | 11/2005 | Harscoet ...................... | 717/166 |
| 6,993,759 B2 * | 1/2006 | Aptus et al. .................. | 717/170 |
| 7,073,171 B2 * | 7/2006 | Shinn et al. .................. | 717/166 |
| 7,076,768 B2 * | 7/2006 | Li et al. ....................... | 717/132 |
| 7,093,242 B2 * | 8/2006 | Bernadat et al. ............ | 717/166 |
| 7,150,015 B2 * | 12/2006 | Pace et al. ................... | 717/176 |
| 7,278,139 B2 * | 10/2007 | Talwar et al. ................ | 717/168 |
| 7,316,010 B1 * | 1/2008 | Daynes et al. ............... | 717/140 |

OTHER PUBLICATIONS

Java!, Tim Richey, Chapters 1,2,6,7, 10,13 and 14, Sep. 22, 1995.*
IBM SurePOS Ace for 4690 OS Version 1, Release 5, IBM, release 2002, 5 pages.*

* cited by examiner

*Primary Examiner*—Todd Ingberg
(74) *Attorney, Agent, or Firm*—Dillon & Yudell LLP

(57) ABSTRACT

A method and system for using a JAVA™ Custom ClassLoader to dynamically build and maintain a list of JAVA™ Class Files and resources that are used by applications that run in Point Of Sale (POS) terminals or other POS devices. The JAVA™ Class Files and resources are ordinarily obtained from a file server known as a controller. If communication between the POS terminal and the controller is lost, other POS devices dynamically collaborate in a "self healing" process to find and provide the required resources (e.g., JAVA™ Class Files) to run the POS terminal in an off-line mode. The present system is thus autonomic, self-learning and self-healing.

9 Claims, 4 Drawing Sheets

AUTONOMIC SELF-HEALING OF JAVA RESOURCES

BACKGROUND OF THE INVENTION

1. Technical Field

The present invention relates in general to the field of computers, and in particular to computers running JAVA™ files. Still more particularly, the present invention relates to a method and system for a novel use of a JAVA™ Custom ClassLoader to dynamically build and maintain a list of JAVA™ Class Files and resources that are used by an application running in a Point Of Sale (POS) device.

2. Description of the Related Art

In a retail environment, Point Of Sale (POS) terminals are used to 1) check out a customer while 2) keeping a running stock inventory based on what items are sold/returned. POS terminals communicate with a controller, which provides files and data to the POS terminal on an as-needed basis.

POS terminals often run using software written in an Object Oriented Programming (OOP) language. OOP utilizes classes, which are data types that allow the creation of objects. A class provides the definition for a collection of objects by describing methods (operations) and specifying the attributes (data) that may be manipulated by those methods. Thus, by defining a class, individual objects (also called "instances") can be created and executed.

A popular OOP language is JAVA™, which is a robust, portable OOP language developed by Sun Microsystems, Inc. (Note that JAVA™ and all JAVA-based marks are a trademark or registered trademark of Sun Microsystems, Inc, in the United States and other countries.) JAVA™ attains its portability through the use of a specially-designed Virtual Machine ("VM"). This virtual machine is also referred to as a "JAVA™ Virtual Machine", or "JVM". The virtual machine isolates the details of the underlying hardware from the compiler used to compile the JAVA™ programming instructions. The compiled code, referred to as JAVA™ "byte code", then runs on top of a JVM, where the JVM is tailored to a specific operating environment.

In a JAVA™ environment, if a POS terminal needs a particular JAVA™ class (data type that allows the creation of an object in JAVA™) for a particular operation (e.g., to exchange a piece of merchandise), then the POS terminal sends a request for that JAVA™ class to the controller, which responds by sending the POS terminal the requested JAVA™ class.

However, if communication should be disrupted between the POS terminal and the controller, then the application running on the POS terminal will crash, due to the unavailability of the needed JAVA™ class.

To address this problem, the 4690 Operating System (OS) Version 3 Release 3 from International Business Machines (IBM™), whose specification is herein incorporated by reference in its entirety, has a feature known as JAVA™ Terminal Offline Function (JavaTOF). (Note that IBM™ is a trademark of International Business Machines Corporation in the United States, other countries, or both.) JavaTOF allows a controller user to create a first zip file containing all JAVA™ classes that may be required by an application, and a second zip file that contains all resource files that may be required by the application. The zip files are then loaded onto a RAM disk on the POS terminal, which allows the application to access the required JAVA™ classes and resource files from the local terminal RAM disk. Thus, if a terminal loses its connection with the controller, the application can continue to operate in Terminal Offline Function Mode.

While JavaTOF is a very useful improvement, it has certain limitations. First, the zip files for the JAVA™ classes and resources must be manually configured. A programmer must decide which files are to be sent to the POS terminal, and then zip and send them from the controller to the POS terminal. This step is error-prone and time consuming. Second, because of their sizes, sending a complete set of JAVA™ classes and resources is a waste of communication bandwidth between the controller and the POS terminal, and can be a waste of memory space in the POS terminal. Third, because JavaTOF uses a static list of resources, if an unexpected dependency should occur in a JAVA™ class, execution of the JAVA™ class will fail if the necessary class or resource is unavailable. Fourth, if all of the JAVA™ classes and resources are not tested before delivery to the POS terminal, then their static nature prevents the POS terminal from having a corrected newer version of the requisite JAVA™ class and/or resource. Fifth, JavaTOF cannot support $3^{rd}$ party applications that are dynamically "plugged-in" at runtime.

What is needed, therefore, is a method and system that allows a customized JAVA™ ClassLoader to dynamically build and maintain a list of JAVA™ Class Files and resources that are used by the POS terminal. Preferably, if communication is broken between the controller and the POS terminal, other POS devices can dynamically collaborate to supply the first POS device with the requisite JAVA™ classes and resources.

SUMMARY OF THE INVENTION

The present invention is thus directed to a method and system for using a JAVA™ Custom ClassLoader to dynamically build and maintain a list of JAVA™ Class Files and resources that are used by applications that run in Point Of Sale (POS) terminals or other POS devices. When the application running in the POS device needs a new JAVA™ Class File, a request is sent to a controller for that needed JAVA™ Class File. Likewise, if the newly loaded JAVA™ Class File needs another resource, such as another JAVA™ Class File, that resource is likewise dynamically loaded into the POS device. If communication between the POS terminal and the controller is lost, other POS devices dynamically collaborate in a "self healing" process to find and provide the required resources (e.g., JAVA™ Class Files) to run the POS terminal in an off-line mode. The present system is thus autonomic, self-learning and self-healing.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
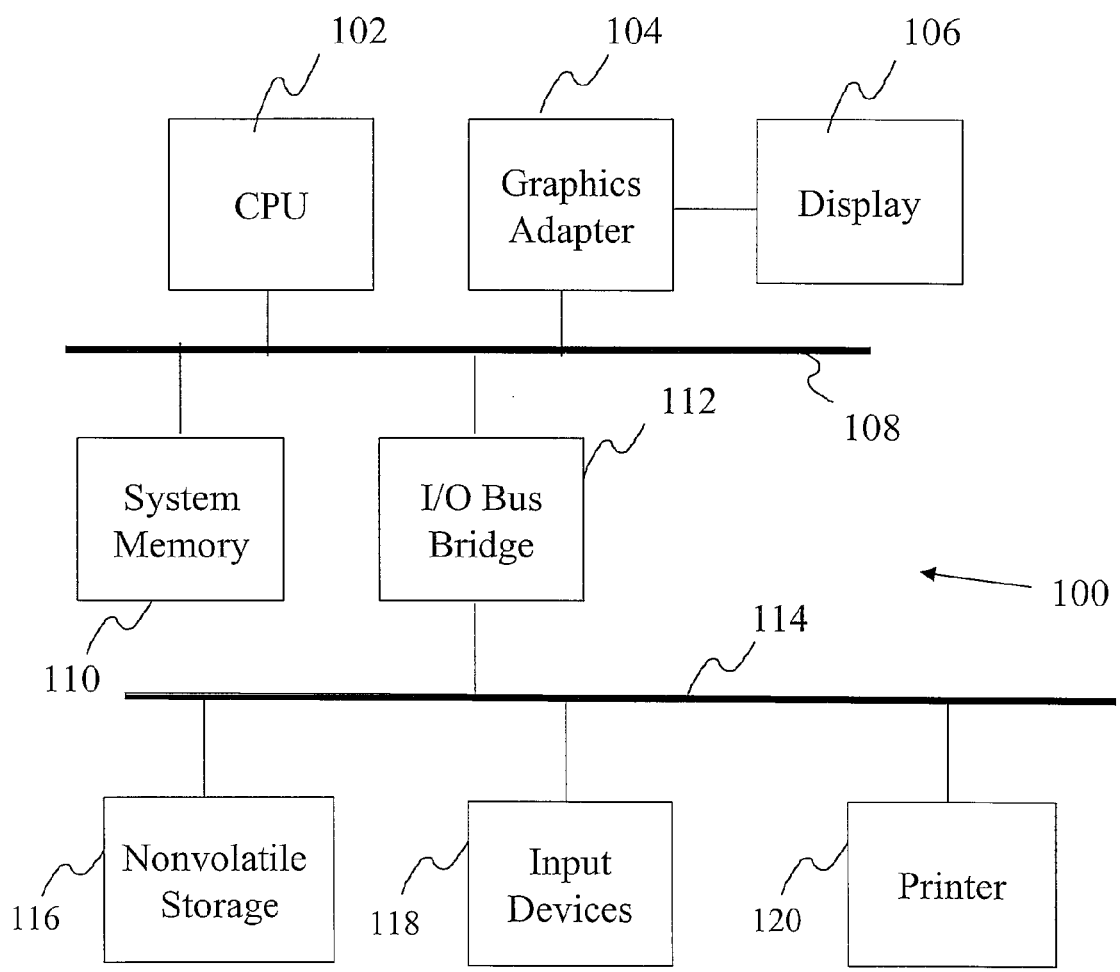
FIG. 1 illustrates an exemplary computer system in which the present invention can be implemented.

With reference now to FIG. 1, there is depicted a block diagram of a data processing system in which a preferred embodiment of the present invention may be implemented. Data processing system 100 represents an exemplary hardware configuration of a Point Of Sale (POS) terminal 304 or a controller 302 shown and described below in reference to FIG. 3a. Data processing system 100 includes a central processing unit (CPU) 102, which is connected to a system bus 108. In the exemplary embodiment, data processing system 100 includes a graphics adapter 104 also connected to system bus 108, for providing user interface information to a display 106.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114. In a POS environment contemplated by the present invention, other exemplary input devices 118 include a bar code scanner, a PIN (Personal Identification Number) keypad device, a POS keyboard, et al. Likewise, a printer 120 is preferably associated at the POS with data processing system 100.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention.

The present invention has particular utility in JAVA™ applications. As described above, JAVA™ is a robust, portable Object Oriented Programming (OOP) language developed by Sun Microsystems, Inc. JAVA™ attains its portability through the use of a virtual machine (i.e., "JAVA™ Virtual Machine—"JVM"). The JVM enables isolating the details of the underlying hardware from the compiler used to compile the JAVA™ programming instructions.

JAVA™ applications are typically constructed using a development toolkit such as the "JDK" ("JAVA™ Development Kit" product from Sun Microsystems, and are executed using the "JRE" (JAVA™ Runtime Environment) product, also from Sun Microsystems. Programs are executed from the command line when using the JRE. The JAVA™ Runtime Environment includes the JVM, as well as a number of files and classes that are required to run JAVA™ applications or applets. Hereinafter, the terms "JVM" and "runtime environment" will be used interchangeably unless otherwise noted.

It should be noted that other companies, most notably IBM™, have their own ported versions of the JDK and JRE. Also, different IBM™ Business Units, specifically IBM™ Retail Store Solutions, have special ports of the JDK and JRE to support specialized devices such as POS Terminals. These custom versions of the JDK and JRE typically contain value adds in areas of security, performance, and enhanced communication support.

JAVA™ program source code typically consists of a set of class definitions stored in as series of text files. A JAVA™ class consists of both the methods and data. JAVA™ source code is compiled into binary code, referred to as JAVA™ "byte code." Byte codes are machine independent, so that they can be executed on any machine's JVM, where the JVM is tailored to the specific operating environment. After the source code files are compiled into JAVA™ byte code class files, they are then loaded into memory by a class loader for interpretation by a JVM interpreter before the associated program is executed. Class loading can also occur when a JAVA™ program dynamically attempts to load another class at run time. The JAVA™ class loader uses a predetermined search strategy when locating class files, which gives precedence to particular locations. As JAVA™ classes are loaded, a record of the classes is maintained in a JAVA™ Archive (JAR) file. JAR files provide compression, backward compatibility with existing JAVA™ applets, portability, and security features.

Loading JAVA™ Classes

The most common way of loading classes in a JAVA™ program is to declare the package (of classes) where the class resides in an "import" statement at the beginning of the program. Then later on in the body of the program instances of the class are created using the "new" keyword. Consider the following pseudocode showing a fragment of a JAVA™ program. The following imports indicate that the classes identified will be loaded during the running of a program:

import java.net.Socket;
    import com.ibm.retail.di.net.protocol.MessageHeaders;
    import com.ibm.retail.RetailException;

Further down in the body of the JAVA™ program are the following lines, which create new instances of the classes identified above:

```
Socket clientSocket = new Socket( );      //load Socket class and create
                                          a new
                                          //Socket object
MessageHeaders msgHdrs = new MessageHeaders( );   //load
                                                  MessageHeaders
                                                  //and create a new
                                                  //MessageHeaders
                                                  object
throw new RetailException(errorMsg, errorCode);   //load
                                                  RetailException
                                                  Class
                                                  //and create a new
                                                  //RetailException
                                                  object if
                                                  //an error occurs
```

Note that according to the specification for the IBM™ 4690 OS, which specification is herein incorporated by reference in its entirety, the "import" method described above is relied on by the JAVA™ TOF tool to build the JAVA™ ARchive (JAR file) of JAVA™ classes. Note also that the class names using this method of loading JAVA™ classes are known ahead of time and are built in to the compiled JAVA™ program.

Although the "import" method described above is the most common way of loading and creating classes, there are cases when it may be advantageous for the class name to be specified at runtime. The class names that are specified to the JAVA™ program at runtime are loaded via the Class.forName( ) mechanism. The class names are typically specified in a properties file that is read in by the JAVA™ program.

There are many reasons why a user may want to load a class via the Class.forName( ). Consider, for example, the loading of device drivers. In a retail store POS (Point Of Sale) printer, the printer's application will need to print cash receipts on the POS printer. The retail store may use IBM™ (International Business Machines) printers as well as NCR (National Cash Register) printers. It is advantageous for the POS application to be written just once to support different types of printers. Therefore, the POS application may require the JAVA™ class to support the specific type of printer to be specified in a properties file. Then at runtime, the POS application reads the printer property from the properties file and then loads the JAVA™ code via the Class.forName( ) method.

Consider the following pseudocode for specifying an IBM™ receipt printer class to be used by an application:

POS.Printer.Handler=com.ibm.retail.device.driver.IbmPosPrinter

If the retailer had an NCR receipt printer, then the property would look like:

POS.Printer.Handler=com.ncr.retail.device.driver.NcrPosPrinter

The POS application then simply reads the value for the setting of the POS.PrinterHandler and then uses this value in a call similar to the following to load the JAVA™ class:

Class.forName(getProperty("POS.Printer.Handler"));

Note that the class name is not specified or known to the compiled JAVA™ code. The class name to load is determined at run time during the execution of the program. The class name is specified outside the scope of the compiled JAVA™ code and is specified as a system property or in a properties file.

Another example of why Class.forName( ) is needed is in the case of the JDBC (JAVA™ DataBase Connectivity) API (Application Program Interface). The JAVA™ application may just want to perform queries on database tables. Since the JAVA™ application cannot be rewritten for each vendors database, there is a system property that needs to be set to specify the name of the JDBC driver that will actually make the detailed queries to the database on behalf of the application. An exemplary property may be jdbc.drivers=COM.ibm.db2.jdbc.app.DB2Driver If the customer had an Oracle database then the name of the Oracle database driver class would be specified. In either case the JAVA™ application reads the value for the db.driver.name property and then issues a Class.forName(getProperty(jdbc.drivers));

to load the JAVA™ class.

Note that for both the "import" and Class.forName methods described above, the Class loader needs to know the location of the class to load. The "classpath" environment variable indicates to the JAVA™ Runtime where to look for the JAVA™ class files to load. The JAVA™ class files are typically built into a collection of class files and stored in a JAR (JAVA™ ARchive) file. In the case of POS terminals described in the present invention, there is a special designation that is custom/proprietary to the 4690 OS implementation of JAVA™ that indicates that the location of the JAR file is on controller 302. The special designation is prepending the characters "R::" to the beginning of the file name. The "R::" means that the file is "Remotely" located on controller 302. The present invention thus addresses this dependency by a POS terminal to be on-line with controller 302 to load the JAVA™ classes. Using a custom Class Loader, which is described in detail below, classes are loaded into the POS device using both the "import" mechanism as well as the "Class.forName" mechanism. These classes are then dynamically listed in a file list in the POS device.

Loss of Communication Between POS Device and Controller

To support the case when a POS terminal loses communication with its controller, JAVA™ TOF builds a predefined list of class files and resources that will be used by the POS terminal sales application. To build this file, JAVA™ TOF takes the JAVA™ source code that is known at the time and "crawls" through the code looking for references of classes in the import statements and then for the statements to load the classes via the "new" keyword. JAVA™ TOF then navigates to each of the classes that were referenced and proceeds in this manner until it builds up the archive of classes that are to be used when the terminal is offline. This approach has limitations in that it only operates on the static definition of classes that exist in the JAVA™ source files at compile time. It is also complex manual process.

Since the standard JAVA™ TOF only deals with the static definitions in the JAVA™ Source code and builds a static archive of the TOF classes, there is no visibility into JAVA™ classes that are loaded dynamically at run time, such as described above using the Class.forName( ) method. Thus, any new classes must be manually added to the properties file, which is very error prone. Another severe limitation of the standard JAVA™ TOF system is that it cannot keep up with all of the other vendor and third party code as they roll out new releases of their software or ship corrective service versions of their software. That is, JAVA™ TOF operates on a compile time view of the JAVA™ classes and has no support for a run time view of the JAVA™ classes that are loaded.

The present invention, therefore, provides a pure run time solution that uses subclassing of the JAVA™ class loader to afford visibility to all of the JAVA™ classes that get loaded by a program. By subclassing, i.e. extending, the base JAVA™ Class Loader according to the present invention, all of the classes that get loaded are visible regardless of the method ("import" or Class.forName) used for loading in the JAVA™ source code. Therefore, the present invention has superior support for the dynamic class file specifications that exist for other vendors and third party solutions as well as easily supporting new versions and code fixes.

Figure 2:
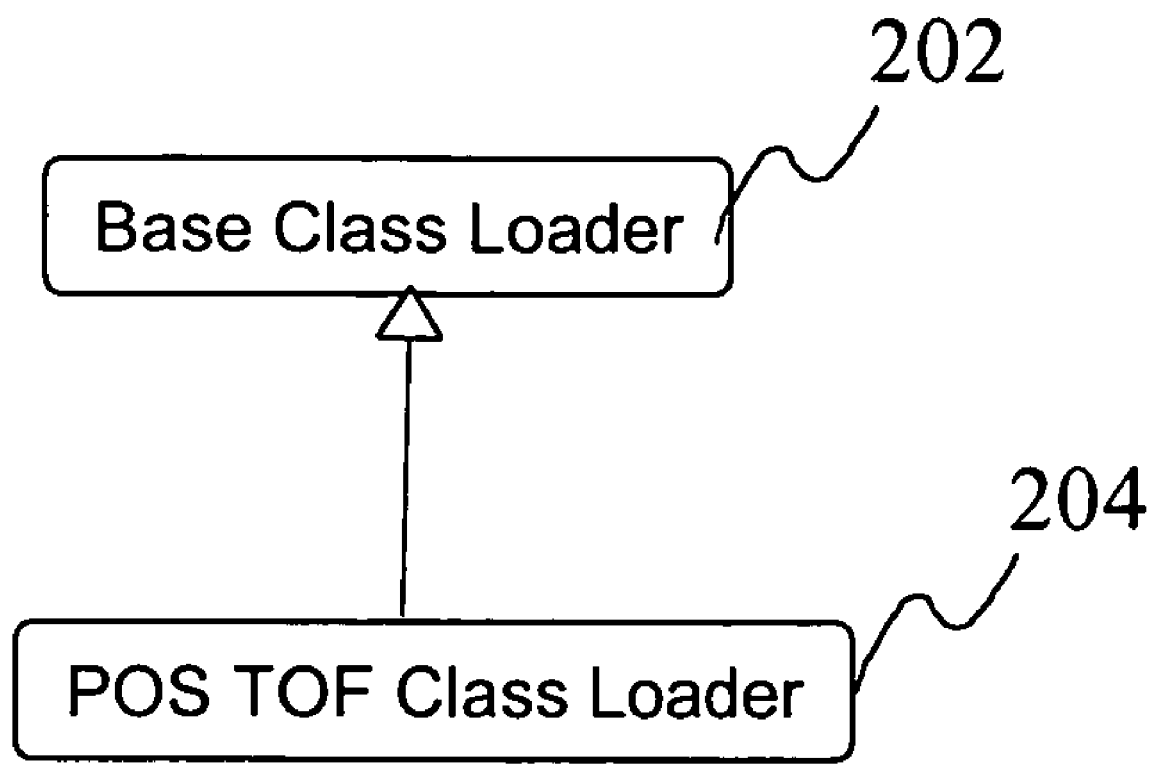
FIG. 2 depicts a custom Class Loader's relationship with a Base Class Loader.

With reference now to FIG. 2, the parent/child relationship of a base Class Loader 202 (often called a Bootstrap Class Loader) and an inventive custom POS (Point Of Sale) TOF (Terminal Offline Function) Class Loader 204 is shown. A Class Loader finds a class file, preferably on a disk in a controller (such as a controller 302 shown in FIG. 3) and reads the class file into RAM in a POS terminal (such as a POS terminal 304 shown in FIG. 3). The Class Loader then calls the command java.lang.ClassLoader.defineClass to tell the POS terminal to treat the loaded RAM image as legitimate byte codes.

In general, a custom Class Loader needs to implement a protected Class findClass(String name) that throws a ClassNotFoundException method that overrides the findClass method from the base class, and a standard protected synchronized Class loadClass(String name, Boolean resolve) to call the findClass class. In addition, the protected URL findResource(String name) can also be implemented to track and locate other resources needed by the application. All other features (methods) are inherited from the Base Class Loader. A custom ClassLoader permits the user to change code on the fly. With a new ClassLoader, different versions of a class can be loaded. The old objects continue to use the old code. New objects use the new code. A given ClassLoader can load a given class only once. There is no need to unload a class. When the objects using it are no longer referenced, the class object itself, along with the code, will be garbage collected. The same classes, loaded by different class loaders are considered distinct classes.

A key feature of the custom POS TOF Class Loader 204 overrides the loadClass and findClass methods of the Base Class Loader 202. That is, rather than loading classes using only one or the other of the import Load Class or Find Name methods described above, custom POS TOF Class Loader 204 is able to load classes using either method. This feature allows POS TOF Class Loader 204 to "see" all classes being loaded, regardless of the method used to load the class. Thus, both static as well as run-time loaded classes are seen by the application running on the POS terminal. As the classes are loaded (by either method), a list of class file names and the associated class file data that is required by the application is built. In a like manner, the POS TOF ClassLoader overrides the findResource method to track and build a list of resources that are used by the application.

Figure 3A:
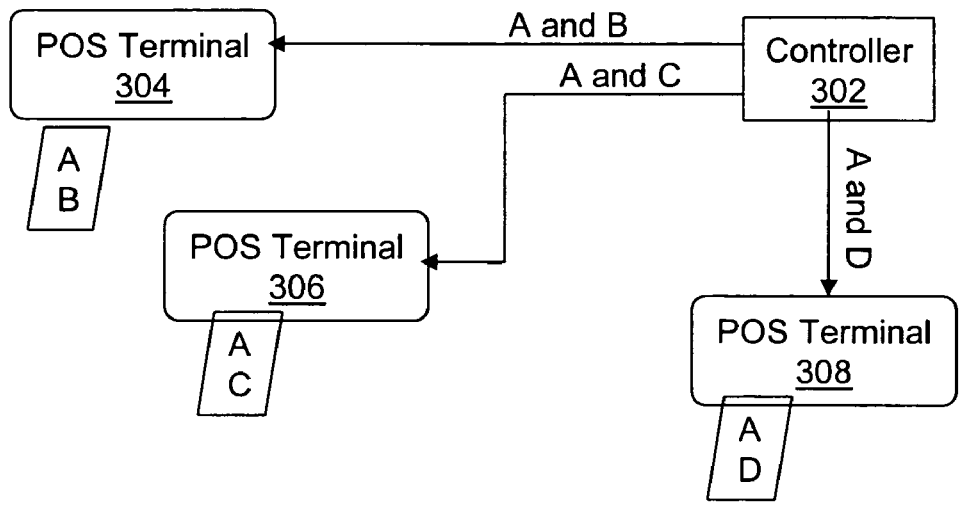
FIG. 3 illustrates logical relationships among Point Of Sale (POS) terminal devices and a Controller.

Referring now to FIG. 3a, there is depicted a diagram of multiple POS terminals (304, 306, 308) coupled to a controller 302. When a POS terminal needs a class, POS TOF Class Loader 204 obtains it from controller 302. For example, POS terminal 304 requests and receives Classes A & B, POS terminal 306 requests and receives Classes A & C, and POS terminal 308 requests and receives Classes A & D.

Figure 3B:
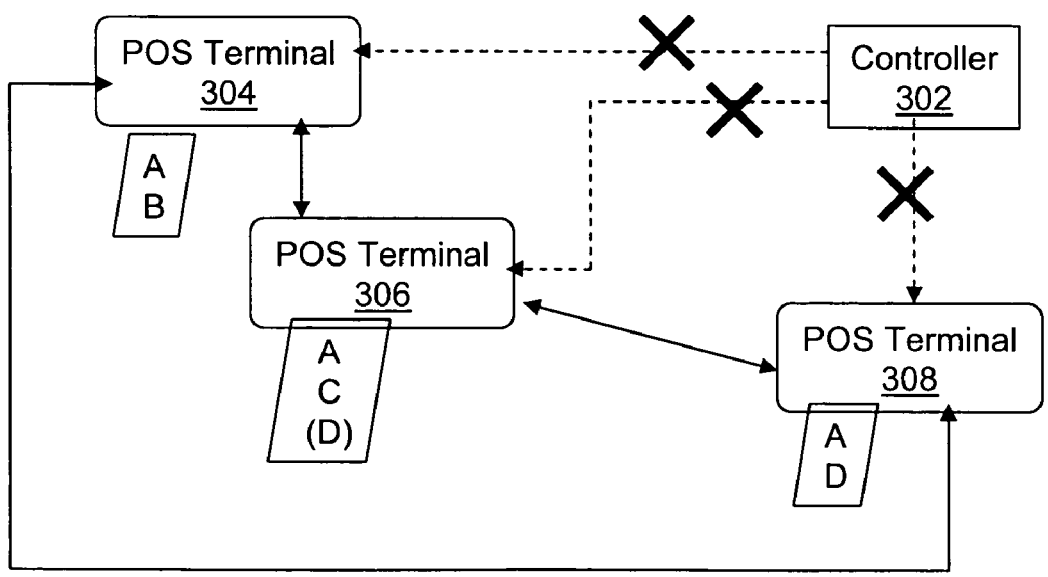

However, consider the condition shown in FIG. 3b, in which connections with controller 302 are lost. Assume that after losing its connection with controller 302, POS terminal 304 subsequently needs Class D. Since POS terminal 304 cannot request Class D from disconnected controller 302, POS terminal 304 requests Class D from the other POS terminals. The POS terminal that currently has Class D is POS terminal 308. Thus, POS terminal 304 can obtain Class D from POS terminal 308. Alternatively, POS terminal 304 may first ask POS terminal 306 for Class D. Although POS terminal 306 does not have a copy of Class D, POS terminal 306 may nonetheless know where POS terminal 304 can obtain a copy (from POS terminal 308), assuming that POS terminal 306 has previously obtained a listing of what Classes POS terminal 308 has. Thus, the present invention has a self-healing capability.

An exemplary method for the self-healing described above may be as follows. A component of the custom JAVA™ Class Loader, identified in FIG. 2 as POS TOF Class Loader 204, causes each instance to also start up a server socket that listens on a TCP/IP port for a multicast address and another port that listens for specific requests for a resource. Each POS terminal periodically transmits an "I'm here!" packet to the multicast address. The "I'm here!" packet contains the host name and port number of the POS device that has implemented the custom JAVA™ Class Loader. Then other devices, also implementing the custom JAVA™ Class Loader, can build a list of devices that can be contacted in the event that a connection to the controller 302 is lost.

The "I'm here!" packet sent by the sending POS terminal also contains a list of resources/classes that the sending POS terminal has. So as a receiving POS terminal listening for the "I'm here!" packet receives the list, it now not only knows what devices can be contacted when the controller is offline but also what devices have what files so that it may reference a searching POS terminal to the sending POS terminal that has the resources/classes that it needs.

Thus, when a connection to the controller 302 is lost, and a POS device requires the loading of a new JAVA™ class file, the POS device sends a Packet requesting a resource (i.e., JAVA™ Class File) to each of the terminals (preferably one at a time) that transmitted the "I'm here!" packet until it gets a favorable response. These favorable responses indicate which terminal responded. Therefore, the requesting terminal can now keep a list of the terminals that seem to have more of the missing files/resources and can dynamically adjust the order in which future requests are made. Note that the favorable response described is either the requested resource or alternatively the response may be the host and port number of a POS device that is known to have the resource.

Note that while FIG. 3b shows communication being lost between all POS terminals and controller 302, the present invention is also useful if communication is lost only between controller 302 and one POS terminal. For example, if communication is lost only between POS terminal 304 and controller 302, then the present invention is still useful to POS terminal 304, which can poll other POS terminals (e.g., POS terminal 306), to obtain a needed file, which may be locally stored on POS terminal 306, or may be acquired by POS terminal 306 from controller 302.

Figure 4:
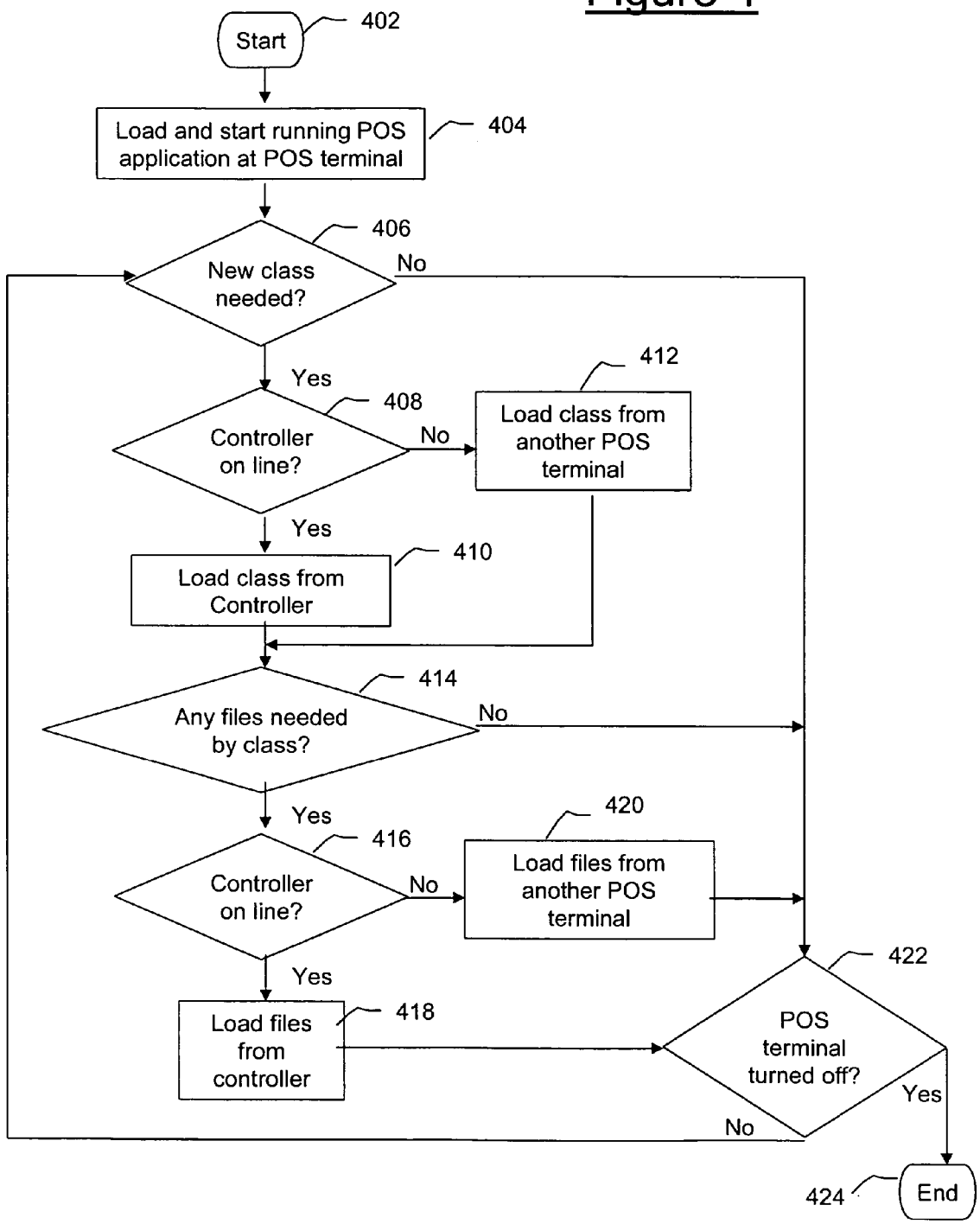
FIG. 4 is a flow chart of steps taken in practicing the present invention.

With reference now to FIG. 4, a flow chart of preferred steps taken by the present invention is shown. After initiator block 402, an application is loaded and started in a POS terminal (block 404). Note that initially only a few core base (bootstrap) JAVA™ classes are initially part of the POS application. Thus, when a query is made as to whether new classes are needed during the running of the POS application (query block 406), the answer is often "Yes." A query is then made as to whether the controller is on line (query block 408). If so, then the requested class is loaded (either using the "import" or "Class.forName" mechanism in the POS TOF Class Loader 204), as shown in block 410. If the controller is not on line, then using the same POS TOF Class Loader 204, the requested file is loaded from another POS terminal (block 412), as described above in FIG. 3.

A query is then made (query block 414) as to whether any dependent files are needed by the loaded class. That is, if the loaded class calls another class, then that called class is a dependent file. Again, if the controller is on line (query block 416), then the POS terminal uses the POS TOF Class Loader 204 to instruct the controller to send the dependent file to the POS terminal (block 418). Otherwise, the dependent file is obtained from another POS terminal using the POS TOF Class Loader 204 (block 420). As long as the POS terminal is running (query block 422), any time a new class is needed by the POS terminal, it can dynamically obtain it from either the controller or another POS terminal. The process ends (terminator block 424) only when the POS terminal is turned off.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

The present invention thus provides a novel use of a JAVA™ custom class loader to solve the problem of auto-configuring devices to run in "offline" modes when the connection to a file server is unavailable. The self-healing autonomic features determine the class files to load and an alternate means of accessing and providing the class file data. Support is provided for JAVA™ applications that use the Class.forName( ) method of loading JAVA™ classes. In addition, the present invention supports customization for specific POS functions (e.g., Price Check, Customer Service Desk, Lay Away, etc.), thus providing dynamic flexibility. Dynamic building of the TOF support for POS terminals is supported both in the product lab, as well as (being completed) in the real store environment, such that support can be rolled out to the store in phases. Support for new and emerging POS terminals, cart mounted systems, hand-held systems, etc. is also dynamically provided. Third party applications or plug ins are supported in their deployment without the need for manual configuration (e.g., Offer Management, Loyalty applications, advertising applications, security applications, etc.). Finally, the start up load time for terminals is significantly reduced.

As described above, the preferred embodiment of the present invention uses a ClassLoader in a way that was not originally intended by the JAVA™ developers. Under the present invention, at runtime of a JAVA™ application, the Class.forName( ) mechanism acts as a Class File Listener that monitors all of the Class files and resources that are actually loaded by a JAVA™ application at runtime. Using the monitored Class files and resources, a list is dynamically built for named resources and associated data that are used by the JAVA™ application. A message is then periodically (on a pre-defined periodic schedule) transmitted from a first client notifying other JAVA™ applications (including those running in other clients) that the POS TOF Class Loader is operational, online, and can pass the compiled list of JAVA™ resources in this (notification) message. The POS TOF Class Loader has a server that is listening for a Presence Notification ("I'm here!") message sent by other POS TOF Class Loaders that are operational, and then uses that list (which is sent as part of the Presence Notification message) to create and maintain a list of known POS systems that have JAVA™ and the list of resources from the other POS TOF Class Loaders. The POS TOF Class Loader has a server that is listening for requests for JAVA™ Class Files/resources. The server responds to the request by either a) sending the requested class file/resource data; b) consulting resource lists from other POS TOF Class Loaders and, if a resource is found, responding with the name of the POS TOF Class Loader that has the requested resource; or c) after consulting the server's list of files/resources and then consulting the lists of other known resources, sending a "resource not found" response to the POS terminal.

The present invention is a "self-healing" process that occurs when a POS device loses connection with the store's controller/file server (primary file server) by taking the following steps. A POS device (client) makes a request for a resource to the first known POS TOF Class Loader (e.g., from the controller). The client either a) uses the data in the response to load the class file, or b) sends the request to the POS TOF Class Loader that is in the response message and is indicated to have the resource. The store controller (file server) in the POS TOF Class Loader handles the request for the requested class file/resource by first consulting its own list of known resources and then, if not found, consulting lists from other known POS TOF Class Loaders and responding to the requestor (client) with the POS TOF Class Loader system that is known to have the resource.

The overall POS system that implements the features described above from a specialized POS TOF Class Loader that includes the steps of 1) using a Class File Listener; 2) building a list of known resources; 3) transmitting a presence notification message that includes a named list of resources; and 4) using a unique Class Loader Server function that creates and maintains lists of other known POS TOF Class Loaders and then handles requests for specific resources. The overall system of POS TOF Class Loaders collaborate to find a required resource in the event that a POS device has lost contact with the Store Controller/Filer Server.

While the invention has been particularly shown and described with reference to a preferred embodiment, it will be understood by those skilled in the art that various changes in form and detail may be made therein without departing from the spirit and scope of the invention. For example, while the preferred embodiment has been described using the TOF feature of the 4690 OS system from IBM™, it could also be implemented in any JAVA™ application (i.e., not just POS devices) and on other Operating Systems, including Windows®, Linux®, or other embedded Operating Systems. Although specific to JAVA™, the present invention can be utilized in any programming architecture that is based on a client/server model and uses a similar concept of discrete files/resources (similar to class files) which are then loaded into a) a type of virtual machine that runs the loaded compiled byte codes, or b) that just runs the loaded programming component.

What is claimed is:

1. A method comprising:

creating a Custom Class Loader from a Base Class Loader in a JAVA™ environment, wherein the Custom Class Loader is able to load JAVA™ class files either using a JAVA™ "import" mechanism or a JAVA™ Class.forName( ) mechanism, wherein the JAVA™ environment operates within an IBM™ 4690 Operating System environment, and wherein the Custom Class Loader operates in a first Point Of Sale (POS) device that is coupled to a controller;

using the Custom Class Loader to dynamically load JAVA™ Classes from the controller to the first POS device, wherein the first POS device requests the JAVA™ Classes in response to a request from an application running on the first POS device, wherein the first POS device is coupled to other POS devices, the other POS devices including a second POS device and a third POS device;

upon an interruption in communication between the controller and the first POS device, sending a request from the first POS device to the other POS devices requesting the JAVA™ Class;

storing in the second POS device a record of JAVA™ Classes stored in the third POS device;

sending a request for the JAVA™ Class from the first POS device to the second POS device, wherein the requested JAVA™ Class is not stored in the second POS device, and wherein the requested JAVA™ Class is stored in the third POS device; and in response to the second POS device not having the requested JAVA™ Class, sending the first POS device information identifying the third POS device as having the requested JAVA™ Class.

2. The method of claim 1, wherein the information includes a TCP/IP address for the third POS device.

3. The method of claim 1, wherein the first POS device is a POS terminal.

4. A method performed in an Object Oriented Programming (OOP) language environment that supports class files, the method comprising:

creating a Custom Class Loader from a Base Class Loader, wherein the Custom Class Loader is able to load class files, and wherein the Custom Class Loader operates in a first Point Of Sale (POS) device that is coupled to a controller;

using the Custom Class Loader to dynamically load Classes from the controller to the first POS device, wherein the first POS device requests the Classes in response to a request from an application running on the first POS device, wherein the first POS device is coupled to other POS devices, the other POS devices including a second POS device and a third POS device;

upon an interruption in communication between the controller and the first POS device, sending a request from the first POS device to the other POS devices requesting the Class;

storing in the second POS device a record of Classes stored in the third POS device;

sending a request for the Class from the first POS device to the second POS device, wherein the requested Class is not stored in the second POS device, and wherein the requested Class is stored in the third POS device; and in response to the second POS device not having the requested Class, sending the first POS device information identifying the third POS device as having the requested Class.

5. The method of claim 4, wherein the information includes a TCP/IP address for the third POS device.

6. The method of claim 4, wherein the first POS device is a POS terminal.

7. A computer storage medium comprising:

computer executable code for creating a Custom Class Loader from a Base Class Loader, wherein the Custom Class Loader is able to load class files, and wherein the Custom Class Loader operates in a first Point Of Sale (POS) device that is coupled to a controller;

computer executable code for using the Custom Class Loader to dynamically load Classes from the controller to the first POS device, wherein the first POS device requests the Classes in response to a request from an application running on the first POS device, wherein the first POS device is coupled to other POS devices, the other POS devices including a second POS device and a third POS device;

computer executable code for upon an interruption in communication between the controller and the first POS device, sending a request from the first POS device to the other POS devices requesting the Class;

computer executable code for storing in the second POS device a record of Classes stored in the third POS device;

computer executable code for sending a request for the Class from the first POS device to the second POS device, wherein the requested Class is not stored in the second POS device, and wherein the requested Class is stored in the third POS device; and computer executable code for in response to the second POS device not having the requested Class, sending the first POS device information identifying the third POS device as having the requested Class.

8. The computer storage medium of claim 7, wherein the information includes a TCP/IP address for the third POS device.

9. The computer storage medium of claim 7, wherein the first POS device is a POS terminal.

* * * * *